United States Patent [19]

Campbell et al.

[11] 4,447,140

[45] May 8, 1984

[54] MICROSCOPE SLIDES

[76] Inventors: Jeptha E. Campbell, 1618 Dell Ter., Cincinnati, Ohio 45230; James E. Gilchrist, 742 Wooster Pike, Terrace Park, Ohio 45174

[21] Appl. No.: 428,429

[22] Filed: Sep. 29, 1982

[51] Int. Cl.³ ............................................. G02B 21/34
[52] U.S. Cl. .................................................... 350/534
[58] Field of Search ...................... 350/534, 535, 536; 356/244

[56] References Cited

U.S. PATENT DOCUMENTS 3,445,152  5/1969  Carter .................................. 350/536
4,171,866 10/1979  Tolles ................................... 350/536

OTHER PUBLICATIONS

"Further Improvements . . . Cells", Cunningham & Szenberg, Immunology 14,599, 1968.

*Primary Examiner*—John K. Corbin
*Assistant Examiner*—Lynn Vandenburgh
*Attorney, Agent, or Firm*—Antonelli, Terry & Wands

[57] ABSTRACT

A multi chambered slide is disclosed having a base plate, a plurality of spaced apart boundaries attached to the base plate, each contiguous pair of boundaries defining an area within which a liquid sample may be contained, each boundary having a pair of spaced apart elements between which is defined a boundary zone for containing any sample that may leak from the area defined by a pair of boundaries, each element being of substantially uniform thickness and being coated with an adhesive and a cover plate attached to the spaced apart elements of the boundaries to define a plurality of volumetric chambers into which liquid samples may be introduced.

8 Claims, 5 Drawing Figures

U.S. Patent  May 8, 1984  4,447,140
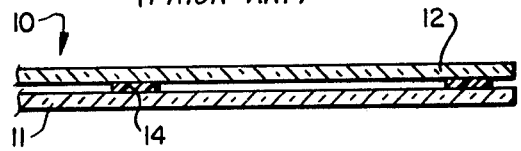
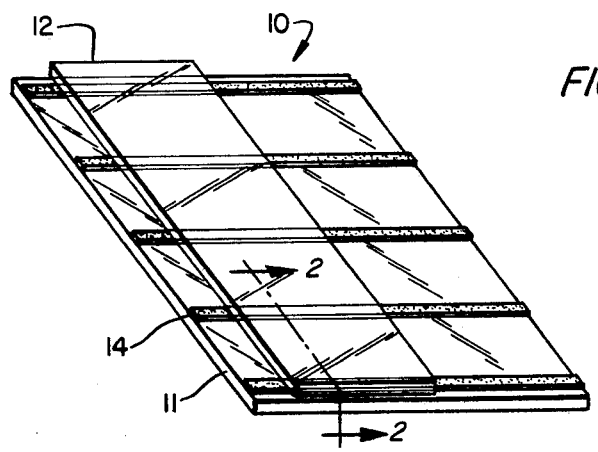
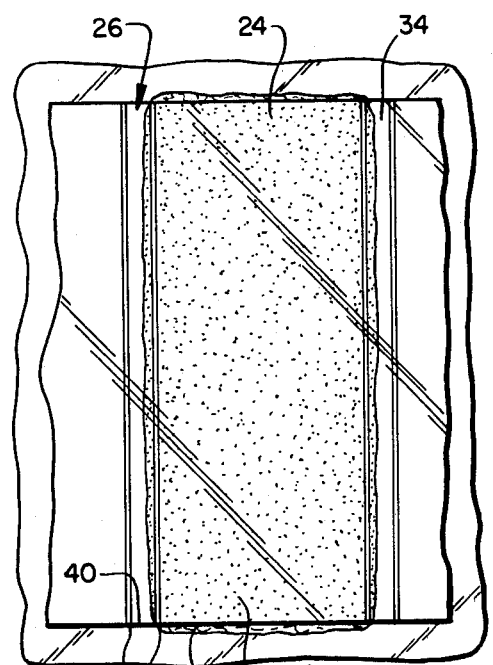
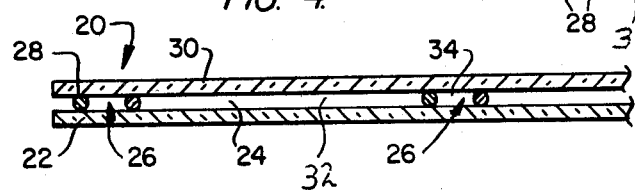
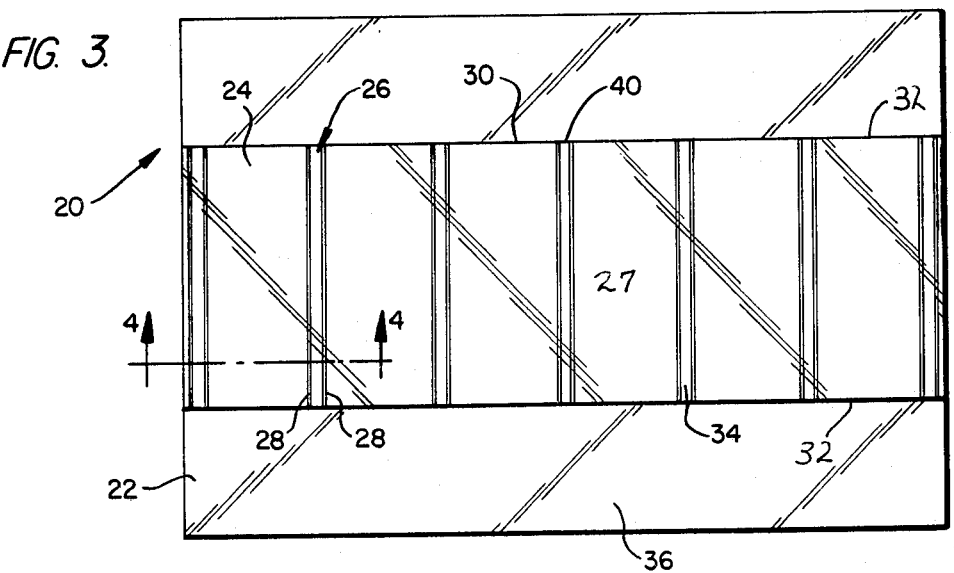

MICROSCOPE SLIDES

BACKGROUND OF THE INVENTION

1. Field of the Invention

The invention relates to microscope slides.

2. Description of the Prior Art

Microscope slides are used for performing diverse types of laboratory microscopic analysis. The slides typically have a transparent base plate to which are attached or as part are a plurality of integrally formed spaced apart parallel boundaries which define an area for containing a liquid sample. A coverslip or other transparent cover is attached to the boundaries to define a plurality of adjacent volumetric chambers which contain samples. The cost of manufacturing these reusable slides is high. The slides are reused to minimize the cost of their use. The cost of cleaning for consequent reuse is in itself a significant expense when a laboratory is using a large number of slides to run a repeated analysis or diverse types of analysis.

Cunningham and Szenberg in Immunology 1968, 14, pages 599–601 describe a method for detecting plaque forming cells. The method is described as using "[f]our pieces of 'double-sided' tape (SCOTCH brand No. 410), each ¼ in. wide, ... laid across a clean microscope slide (75×25 mm) dividing it into three equal areas ... precleaned coverslips (22 mm square) are pressed firmly onto the tape to form three shallow chambers, as shown in FIG. 1." In a note it is further stated "[l]arge numbers of slide chambers may be very quickly assembled by substituting a second slide for the coverslips and using three strips of tape instead of four."

Classes in immunology at the Univ. of Wisconsin in 1974 or 1975 were given a microscope slide design as part of class material. FIGS. 1 and 2 infra of the drawings illustrate the aforementioned slide design.

U.S. Pat. No. 4,171,866 discloses a disposable volumetric slide having tape boundaries for defining chambers similar to those disclosed in the aforementioned prior art.

Slides having chamber boundaries defined by single pieces of tape coated on two sides have disadvantages. In practice it has been found that this type of slide is subject to leakage from and between the volumetric chambers. That leakage can be difficult to detect within the boundary area for the reason that there is insufficient volume into which liquid sample may accumulate to facilitate its visual detection. A fluid leakage path across a single continuous tape boundary does not usually have sufficient volume to permit detection of significant leaks. In some types of analysis it is important to use a precise volume of sample contained within the sample area. Laboratory personnel can not insure accuracy of microscopic analysis without a method for easily visually detecting if leakage has occured. Moreover, the susceptibility of the slide to leakage greatly enhances the possibility of cross contamination between adjacent volumetric chambers.

SUMMARY OF THE INVENTION

The invention is a multi chambered slide which is highly resistant to leakage between adjacent chambers. Leakage can cause deleterious cross contamination and or large reductions in volume within the individual chambers which can seriously affect experimental accuracy.

Leakage between adjacent chambers in the invention is minimized by pairs of spaced apart fluid tight boundaries which define the individual volumetric chambers. Each boundary has a pair of spaced apart elements which are adhesively attached to a base plate and a cover plate to define a boundary zone into which leakage fluid can accumulate in readily visible quantities without cross contamination of adjacent volumetric chambers. In addition to facilitating the detection of leaks, the openings to the boundary zone may be used to dispose of contaminated residual amounts of sealant (such as petroleum jelly) used for sealing the openings of a previously sealed volumetric chamber. This residual sealant could contaminate the next chamber to be sealed if it is not disposed.

A multi chambered slide in accordance with the invention includes a base plate, at least three spaced apart boundaries attached to the base plate, each contiguous pair of boundaries defining an area within which a sample may be contained, each boundary having a pair of spaced apart elements between which is defined a boundary zone for containing any sample that may leak from the area defined by a pair of boundaries, each element being of a substantially uniform thickness and being coated with an adhesive and a cover plate attached to the spaced apart elements of the boundaries to define a plurality of volumetric chambers into which liquid samples may be introduced.

In the preferred embodiment, the base plate is rectangular in shape, the elements are spaced apart parallel filaments of fiber which extend across the width of base plate and the cover plate is rectangular in shape and is larger in area than the base plate to define a surface adjacent to the openings to the individual volumetric chambers.

The materials which may be used to manufacture a multi chambered cell in accordance with the invention are low in cost which enhances its disposability. Preferably, the base plate and cover plate are made from pieces of flat glass or plastic and the filaments are polyester, acetate, cotton or blends thereof which typically have diameters from 0.05 to 0.15 mm depending upon the desired volumes to be used. The filaments are coated with a sample insoluble pressure sensitive adhesive which will securely bond the base and cover plates to the filaments upon the application of suitable pressure.

The advantages of the invention when compared with the aforementioned prior art are at least as follows: The double barrier boundary between adjacent chambers with an intermediate boundary zone minimizes the possibility of leakage between chambers and if leakage occurs it will be evident from the accumulation of sample within the boundaries zone. In the absence of leakage, liquid diffusion between chambers is impossible (semi-permeable membrane effect). The double elements within each boundary make sealing without cross contamination much easier. Almost any combination of rectangular sizes and volumes may be produced.

BRIEF DESCRIPTION OF THE DRAWINGS

FIG. 1 is a top view of a prior art multi chamber cell;

FIG. 2 is sectional view of FIG. 1 taken along section line 2—2;

FIG. 3 is a top view of a multi chambered slide in accordance with the invention;

FIG. 4 is sectional view of FIG. 3 taken along section line 4—4; and

FIG. 5 is an expanded top view illustrating the capability of the invention in preventing cross contamination between adjacent volumetric chambers.

DESCRIPTION OF THE PREFERRED EMBODIMENT

FIGS. 1 and 2 illustrate the prior art multi chambered slide design presented to the aforementioned immunology classes at the University of Wisconsin. The slide 10 has a base plate 11, a cover plate 12, and a plurality of spaced apart boundaries 14. The boundaries 14 are tape sections having adhesive on both sides. While the disclosed multichambered slide can be manufactured to provide chambers of precise volumetric capacity, it has been found in practice that the tape sections 14 are subject to leakage which is difficult to detect because the leakage paths are hard to spot. Large volume leaks can effect the accuracy of various types of microscopic analysis. Moreover, leakage between adjacent chambers can cause deleterious cross contamination which can significantly effect experimental accuracy.

FIGS. 3 and 4 illustrate respectively a top view and a sectional view of FIG. 3 taken along section line 4—4 of the present invention 20. The invention 20 has a base plate 22 which may be made of low cost flat glass or plastic. The thickness of the base plate 22 is not critical. The preferred shape of the base plate 22 is rectangular. Each volumetric chamber 24 has spaced apart boundaries 26. Each pair of boundaries 26 is adhesively bonded to the base plate 22 to define an area 27 for containing a sample. Each boundary 26 is comprised of a pair of spaced apart parallel elements 28 which have been coated with a pressure sensitive adhesive that is insoluble in the samples to be contained in the volumetric chamber 24. The filaments may be made from polyester, acetate, cotton, or blends of uniform diameter and may have diameters varying from 0.05 to 0.15 mm inches. As an alternative to filaments 28, spaced apart tape sections of precise thickness may be used which have been coated with an adhesive on both sides. In the preferred embodiment, the elements 28 extend completely across the width of the cover plate 30. The rectangular shape of each volumetric chamber 24, which is consequent from the boundaries 26 being parallel, facilitates the calculation of volume by the multiplication of the area 27 by the known diameter of the filaments 28. A cover plate 30 is adhesively bonded to the filaments 28 to define the volumetric chamber 24. Each volumetric chamber has a pair of opposed openings 32 which are defined by the base plate 22, elements 28 and cover plate 30. Each pair of contiguous elements 28 defines a boundary zone 34 into which sample may leak without causing cross contamination of the adjacent volumetric chamber 24. The cover plate 30 is preferrably rectangular in shape and has a surface area which is smaller than the surface area of the base plate 22 to provide a surface 36 adjacent to each of the openings 32 to the individual volumetric chambers 24. The surface 36 facilitates the injection of the sample into the volumetric chambers 24 by a syringe or other suitable apparatus.

FIG. 5 illustrates the use of the invention in preventing cross contamination when a sample 38 has been injected into the volumetric chamber 24. Normally, a sealing fluid 39, such as petroleum jelly, is used to close the openings 32 of each individual volumetric chamber 24 to contain a precise volume of fluid sample 38. The boundary zone 34, which is defined by the parallel contiguous elements 28, functions as an accumulator of any leakage of the sample 38 from the adjacent volumetric chamber. As can be seen from FIG. 5, the sample can leak past the first element 28 adjacent to the volumetric chamber 24 into the boundary zone 34 without leakage into the adjacent volumetric chamber 24. In practice it has been found that the boundary zone 34 is an effective mechanism for preventing cross contamination. The opening 40 to each boundary zone may be used as a volume for disposing of residual sealing fluid which contacted the sample within the previously sealed volumetric chamber 24. Without disposal of residual sealing fluid contamination could result in the sample within the next volumetric chamber to be sealed.

The multi chambered slide 20 of the invention may be made by any suitable manufacturing process. The manufacturing process is not present invention.

While the present invention has been described in terms of its preferred embodiment, it should be clearly understood that numerous modifications to the present invention may be made without departing from the spirit and scope of the invention as defined by the appended claims.

What we claim as our invention is:

1. A multi chambered slide comprising:
   (a) a base plate;
   (b) at least three spaced apart boundaries attached to the base plate, each contiguous pair of boundaries defining an area within which a liquid sample may be contained, each boundary having a pair of spaced apart elements between which is defined a boundary zone for containing any sample that may leak from an area defined by a pair of boundaries, each element being of a substantially uniform thickness and being coated with an adhesive; and
   (c) a cover plate attached to the spaced apart elements of the boundaries to define a plurality of volumetric chambers into which a liquid sample may be introduced.

2. A slide in accordance with claim 1 wherein the elements are filaments of fiber.

3. A slide in accordance with claim 1 wherein the elements are made from tape coated with adhesive on each side.

4. A slide in accordance with claims 1, 2, or 3, wherein the cover plate has an area larger than the area of the base plate.

5. A slide in accordance with claim 4 wherein each volumetric chamber has a pair of opposed openings which are defined by the boundaries, the cover, and the base plate; the openings permitting the introduction of the liquid sample into the volumetric chamber; and the cover plate providing a surface adjacent to each opening to the individual chambers.

6. A slide in accordance with claim 5 wherein the elements are substantially parallel and are of substantially the same length.

7. A slide in accordance with claim 6 wherein the cover plate and the base plate are rectangular in shape and the elements are disposed across the width of the base plate.

8. A slide in accordance with claim 1 wherein the adhesive is pressure sensitive and is insoluble in the samples to be contained in the volumetric chambers.

* * * * *